(12) United States Patent
Kang et al.

(10) Patent No.: US 7,103,485 B2
(45) Date of Patent: Sep. 5, 2006

(54) METHOD FOR COMPENSATING SECONDARY CURRENT OF CURRENT TRANSFORMERS

(75) Inventors: Yong-Cheol Kang, Chonju-si (KR); Sang-Hee Kang, Seoul (KR); Yi-Jae Lim, Chonju-si (KR)

(73) Assignee: Myongji University, Kyeonggido (KR)

( * ) Notice: Subject to any disclaimer, the term of this patent is extended or adjusted under 35 U.S.C. 154(b) by 0 days.

(21) Appl. No.: 10/494,870

(22) PCT Filed: Apr. 17, 2003

(86) PCT No.: PCT/KR03/00788

§ 371 (c)(1),
(2), (4) Date: Oct. 25, 2004

(87) PCT Pub. No.: WO2004/093115

PCT Pub. Date: Oct. 28, 2004

(65) Prior Publication Data

US 2005/0035751 A1 Feb. 17, 2005

(51) Int. Cl.
*G06F 17/13* (2006.01)
(52) U.S. Cl. ............................ 702/64; 702/65; 702/66; 702/67
(58) Field of Classification Search ................ 702/56, 702/58, 60, 64, 66, 124, 182; 323/357; 363/98; 318/749; 700/108
See application file for complete search history.

(56) References Cited

U.S. PATENT DOCUMENTS 3,786,338 A * 1/1974 Gilbert ........................ 323/359
5,552,979 A * 9/1996 Gu et al. ........................ 363/98

2005/0073281 A1* 4/2005 Kerlin et al. ................ 318/749
2005/0140352 A1* 6/2005 Allain et al. ................ 323/357

FOREIGN PATENT DOCUMENTS

| JP | P01-018207 A | 1/1989 |
| JP | P01-154506 A | 6/1989 |
| JP | P03-066109 A | 3/1991 |
| JP | 2002-008934 A | 1/2002 |

\* cited by examiner

*Primary Examiner*—Marc S. Hoff
*Assistant Examiner*—Felix Suarez
(74) *Attorney, Agent, or Firm*—The Webb Law Firm

(57) ABSTRACT

A method for preventing the unwanted maloperation of a protective relay system that is caused by the imprecise detection of an actual secondary current value resulting from a measured secondary current being distorted comprises the steps of calculating difference values for sampled secondary currents; comparing absolute values of the difference values with a predetermined critical value, and determining a saturation starting moment of a current transformer when one of the absolute values exceeds the predetermined critical value; obtaining a magnetizing current at the saturation starting moment using the difference values if the saturation starting moment is determined, and obtaining a magnetic flux value in a steel core of the current transformer from a magnetization curve using the magnetizing current; calculating a magnetic flux value at a time after the saturation starting moment using a secondary current value measured at that time and the magnetic flux value obtained at the saturation starting moment so as to obtain a secondary current value consistent with a current transformation ratio at that time; obtaining a magnetizing current at that time from the magnetization curve using the magnetic flux value calculated at that time; and obtaining the secondary current value consistent with the current transformation ratio by adding the obtained magnetizing current and the measured secondary current value.

18 Claims, 7 Drawing Sheets

METHOD FOR COMPENSATING SECONDARY CURRENT OF CURRENT TRANSFORMERS

TECHNICAL FIELD

The present invention relates generally to a method of compensating the secondary currents of current transformers in a protective relay system for protecting a power system, and, more particularly, to a method of compensating the secondary currents of current transformers, which can make it possible to obtain precise secondary current values consistent with a current transformation ratio even during the saturation of a current transformer so as to prevent the unwanted maloperation of a protective relay system that is caused by the imprecise detection of an actual secondary current value resulting from a measured secondary current being distorted because a current transformer is saturated by a fault current.

BACKGROUND ART

A current transformer is an apparatus for measuring a current flowing through a power system and inputting the measured current to a protective relay system. As shown in FIG. 1, the current transformer comprises a core 34 for concentrating a magnetic flux generated by a primary current flowing through a line 32 and a secondary coil 36 adapted to surround the core 34 for generating a secondary current using a magnetic flux induced to the core 34. A current flowing through the line 32 functioning as a primary coil induces a current proportional to the former current to the secondary coil 36, and the magnitude of current is determined according to a current transformation ratio. In this case, a steel core current transformer, in which the core 34 is steel, is chiefly used to maximize an interlinkage magnetic flux between the line 32 and the secondary coil 36.

FIG. 2 illustrates a schematic equivalent circuit of a current transformer. In this drawing, $L_m$ denotes a magnetizing inductance, $i_m$ denotes a magnetizing current, $i_1$ denotes a secondary current (consistent with a current transformation ratio) induced to a secondary side by a primary current, and $i_2$ denotes an actually measured secondary current. The magnetizing inductance $L_m$ is not a constant, but has different values depending upon magnetizing currents. In particular, if a magnetic flux increases and exceeds a specific limit, the magnetizing inductance $L_m$ varies considerably, which results from a variation in the internal state of a current transformer. In such a case, it is stated that the current transformer is saturated.

Since the magnitude of the magnetizing current $i_m$ is small during normal operations, the measured primary current value of the current transformer is proportional to the primary current value thereof, so that a precise primary current value can be obtained from the measured secondary current value, thus causing no problem. However, if the magnetizing inductance value of the current transformer varies considerably by the saturation of the current transformer, the secondary current value varies considerably. If this phenomenon is described based on the equivalent circuit of FIG. 2, at the time of saturation, $L_m$ value considerably decreases and, therefore, the magnetizing current $i_m$ increases, so that the difference between the actually measured secondary current $i_2$ and the secondary current $i_1$ consistent with the current transformation ratio increases. Accordingly, a correlation between the actually measured secondary current $i_2$ and the secondary current $i_1$ becomes different after saturation. Meanwhile, the current transformer detects the value of a current flowing through the line using $i_2$ even after saturation, so that it is imprecisely determined that the value of the current flowing through the line has decreased, thus causing the delay of the operation time of the protective relay system and the unwanted maloperation of the protective relay system.

FIGS. 6a and 6b are examples of magnetization curves showing correlations between magnetizing currents and interlinkage fluxes before and after saturation. FIG. 6a shows the transition of a magnetization curve in unsaturated and saturated regions. The slope of the magnetization curve represents magnetizing inductances $L_m$. FIG. 6b shows an example of an actual magnetization curve. As shown in FIGS. 6a and 6b, magnetizing inductances are considerably different before and after saturation.

For a conventional technology of compensating for current distortion resulting from the saturation of a current transformer, which is a main reason for the unwanted maloperation of a protective relay system, and obtaining a secondary current consistent with an actual current transformation ratio, there is proposed a method of calculating a magnetic flux in a steel core constituting part of a current transformer at the time of saturation and compensating for the distorted secondary current using the calculated magnetic flux to obtain a secondary current consistent with a current transformation ratio. However, the conventional method can be applied only to the case where a remanent magnetic flux does not exist at an early stage. In the case where a remanent magnetic flux exists at an early stage, the application of the conventional method is limited, if the initial value of the remanent magnetic flux is not known. In most applications, it is difficult to measure and estimate the value of the remanent magnetic flux using existing technology, so that the above-described disadvantage becomes fatal.

DISCLOSURE OF THE INVENTION

Accordingly, the present invention has been made keeping in mind the above problems occurring in the prior art, and an object of the present invention is to provide a method for compensating the secondary currents of current transformers, which can obtain a precise secondary current value consistent with a current transformation ratio during the saturation of a current transformer even when there is no information on the value of an initial remanent magnetic flux, thus preventing the unwanted maloperation of a protective relay system caused by the imprecise detection of an actual current value resulting from the distortion of the secondary current during the saturation of the current transformer.

In order to accomplish the above object, the present invention provides a method of compensating for secondary currents of current transformers due to saturation, comprising the steps of calculating difference values having at least second order for sampled secondary currents; comparing absolute values of the difference values with a predetermined critical value, and determining a saturation starting moment of a current transformer when one of the absolute values exceeds the predetermined critical value; obtaining a magnetizing current at the saturation starting moment using the difference values if the saturation starting moment is determined, and obtaining a magnetic flux value in a steel core of the current transformer from a magnetization curve using the magnetizing current; calculating a magnetic flux value at a time after the saturation starting moment using a secondary current value measured at that time and the magnetic flux value obtained at the saturation starting moment so as to obtain a secondary current value consistent with a current transformation ratio at that time; obtaining a magnetizing current at that time from the magnetization curve using the magnetic flux value calculated at that time; and obtaining the secondary current value consistent with the current transformation ratio by adding the obtained magnetizing current and the measured secondary current value.

Preferably, the step of obtaining the magnetic flux value in the steel core at the saturation starting moment may further comprise the step of approximating the magnetizing current at the saturation starting moment as a value obtained by assigning a negative sign to each difference value.

Preferably, the difference values may be second order difference values.

Preferably, the difference values may be third order difference values.

In accordance with another aspect of the present invention, the present invention provides a storage medium storing a computer program for compensating for distortion of secondary currents of current transformers due to saturation, the program executing the steps of calculating difference values having at least second order for sampled secondary currents; comparing absolute values of the difference values with a predetermined critical value, and determining a saturation starting moment of a current transformer when one of the absolute values exceeds the predetermined critical value; obtaining a magnetizing current at the saturation starting moment using the difference values if the saturation starting moment is determined, and obtaining a magnetic flux value in a steel core of the current transformer from a magnetization curve using the magnetizing current; calculating a magnetic flux value at a time after the saturation starting moment using a secondary current value measured at that time and the magnetic flux value obtained at the saturation starting moment so as to obtain a secondary current value consistent with a current transformation ratio at that time; obtaining a magnetizing current at that time from the magnetization curve using the magnetic flux value calculated at that time; and obtaining the secondary current value consistent with the current transformation ratio by adding the obtained magnetizing current and the measured secondary current value.

In accordance with still another aspect of the present invention, the present invention provides a protective relay system having a function of compensating for distortion of secondary currents of current transformers due to saturation, comprising means for calculating difference values having at least second order for sampled secondary currents; means for comparing absolute values of the difference values with a predetermined critical value, and determining a saturation starting moment of a current transformer when one of the absolute values exceeds the predetermined critical value; means for obtaining a magnetizing current at the saturation starting moment using the difference values if the saturation starting moment is determined, and obtaining a magnetic flux value in a steel core of the current transformer from a magnetization curve using the magnetizing current; means for calculating a magnetic flux value at a time after the saturation starting moment using a secondary current value measured at that time and the magnetic flux value obtained at the saturation starting moment so as to obtain a secondary current value consistent with a current transformation ratio at that time; means for obtaining a magnetizing current at that time from the magnetization curve using the magnetic flux value calculated at that time; and means for obtaining the secondary current value consistent with the current transformation ratio by adding the obtained magnetizing current and the measured secondary current value.

Figure 1:
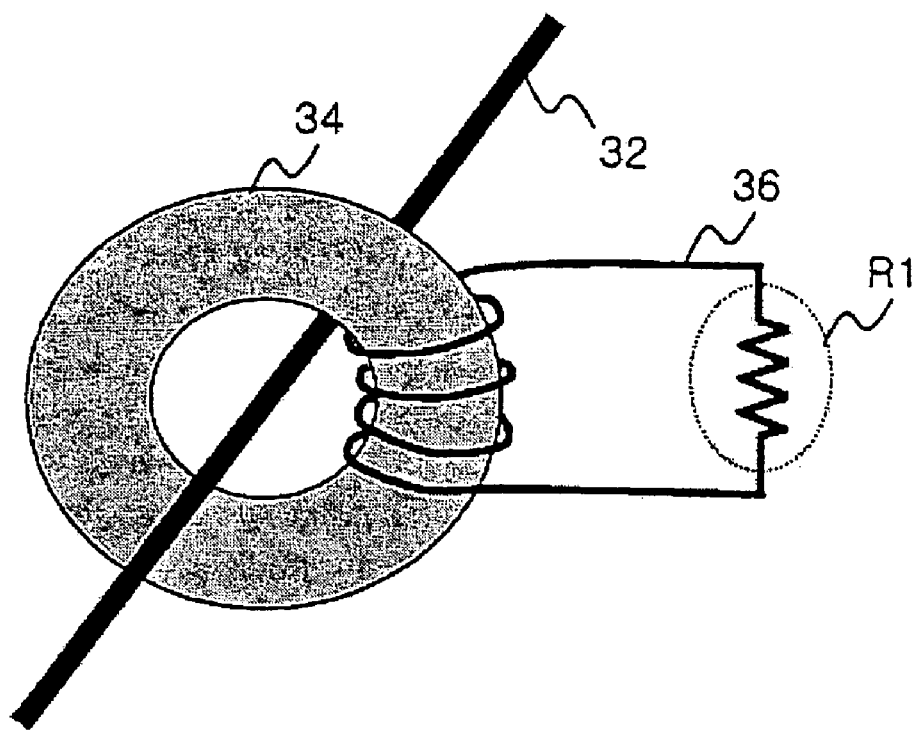
FIG. 1 is a diagram showing a general construction of a current transformer.

Description of Reference Numerals of Principal Elements of the Drawings

32: line
34: steel core
36: secondary winding

BEST MODE FOR CARRYING OUT THE INVENTION

A preferred embodiment of the present invention is described below in detail with reference to the accompanying drawings.

Figure 3:
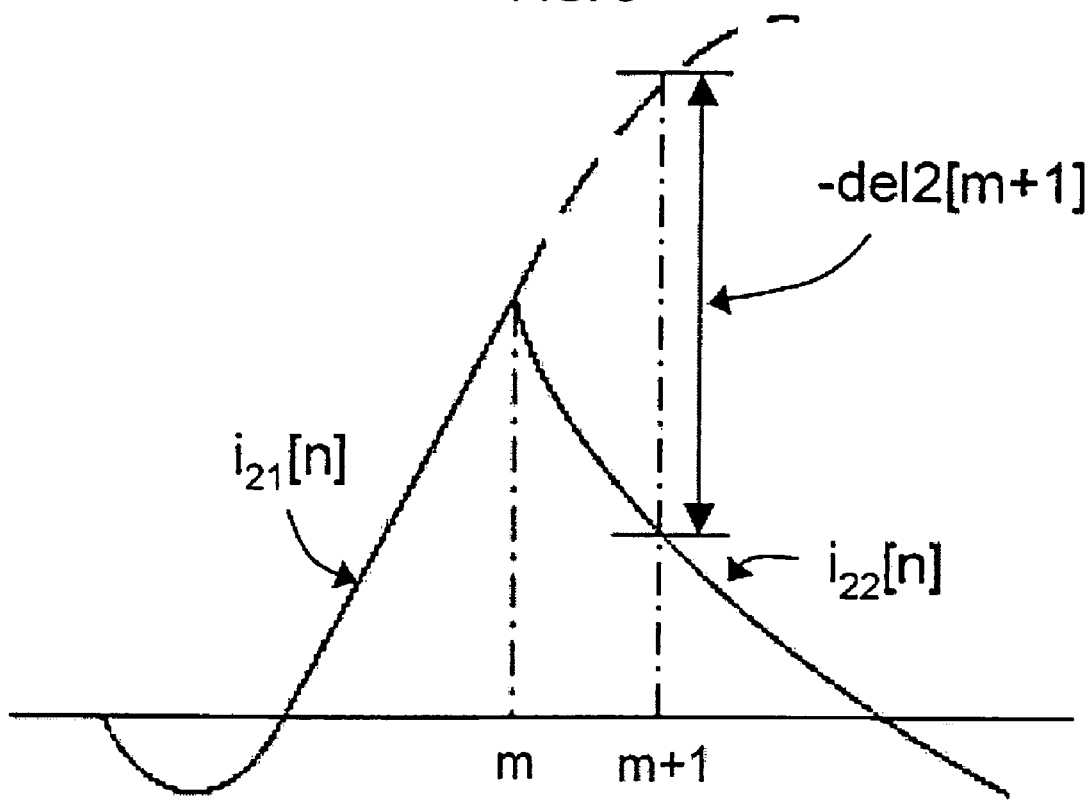
FIG. 3 is a graph representing the transition of secondary currents before and after the saturation of the current transformer.

FIG. 3 exemplarily shows the transition of secondary currents $i_2[n]$ (solid line) actually measured in the vicinity of the saturation starting point of a current transformer. The current transformer is saturated at the time n=m. Currents are measured after saturation. In this case, secondary currents measured before saturation are represented by $i_{21}[n]$ and secondary currents measured after saturation are represented by $i_{22}[n]$. Since secondary currents $i_1[n]$ consistent with a current transformation ratio are actually measured secondary currents, that is, $i_2[n]$ measured before saturation, the actually measured secondary currents substantially consist with the $i_{22}[n]$ in the drawing, which reflect the secondary currents $i_1[n]$ consistent with the current transformation ratio. After saturation, a secondary currents $i_1[n]$ consistent with a current transformation ratio are considerably different from actually measured secondary currents, as shown in. FIG. 3. In FIG. 3, secondary currents consistent with the current transformation ratio after saturation are represented by a dotted line extending from $i_{21}[n]$.

Secondary currents $i_1(t)$ precisely reflecting primary currents at the time of a fault and consistent with a current transformation ratio can be expressed by the following equation:

$$i_1(t) = \begin{bmatrix} I_{\max}[\cos(\omega t - \theta) - e^{-t/T_p}\cos\theta], & \text{for } t \geq 0 \\ 0, & \text{for } t < 0 \end{bmatrix} \quad (1)$$

where $I_{max}$, $T_p$ and $\theta$ denote a maximum fault current, a primary time constant and a fault inception phase angle, respectively. In this case, actually measured secondary currents are expressed as follows:

$$i_2[t] = Ae^{-t/T_s} + Be^{-t/T_p} - C\sin(\omega t - \theta - \phi) \quad (2)$$

where $T_s$ denotes a secondary time constant and $\tan\phi = T_s$.

The discrete time version $i_2[n]$ of the secondary currents can be obtained by the following equation:

$$i_2[n] = Ae^{-nT/T_s} + Be^{-nT/T_p} - C\sin\left(\frac{2\pi}{N}n - \theta - \varphi\right) \quad (3)$$

where T denotes a sampling interval and N denotes the number of samples per cycle. This equation comprises two exponential terms, which decrease exponentially, and one sinusoidal term.

The first order difference of $i_2[n]$ is expressed as follows:

$$\begin{aligned}del1[n] &= i_2[n] - i_2[n-1] \\ &= A(1-e^{T/T_s})e^{-nT/T_s} + B(1-e^{T/T_p})e^{-nT/T_p} - \\ &\quad C\left(2\sin\frac{\pi}{N}\right)\sin\left(\frac{2\pi}{N}n - \theta - \varphi - \frac{\pi}{N} + \frac{\pi}{2}\right)\end{aligned} \quad (4)$$

If a frequency is 60 Hz and N=64, T=0.26 ms. If Ts=1 s and Tp=0.02 s, the reduction ratios of the two exponential terms, that is, $1-e^{T/T_s}$ and $1-e^{T/T_p}$, are 0.00026 and 0.0131, respectively. Accordingly, if the time constant is sufficiently large, the exponential terms of del1[n] are negligible.

The magnitude of the sinusoidal term of del1[n] is 2 sin(π/N)C=0.098C. That is, about 10% of the components of the sinusoidal term of del1[n] remain. Consequently, if the secondary currents have the form of Equation (3), del1[n] has almost no exponential terms but the sinusoidal term, and the magnitude of Equation (3) is 10% of an original magnitude.

The second order difference function of $i_1[n]$ is defined as follows:

$$del2[n] = del1[n] - del1[n-1] \quad (5)$$

In this equation, if N=64, it can be appreciated from Equation (4) that the magnitude of del2[n] is $[2\sin(\pi/N)]^2C = 0.009604C$, that is, 1% of the magnitude of the sinusoidal term of $i_2[n]$.

It is assumed that a current is measured at n=m+1 after saturation. If $i_{21}[n]$ represents currents before saturation and $i_{22}[n]$ represents currents after saturation, as defined above, Equation (3) is formed. Further, $i_{21}[m]=i_{22}[m]$ and $i_{21}[m+1]\ne i_{22}[m+1]$. $i_1[m+1]$, which are secondary currents precisely reflecting primary currents to obtain and consisting with a current transformation ratio, can be approximated as $i_{21}[m+1]$ extending from the transition of secondary currents measured before saturation, which correspond to values on an extension line represented by a dotted line, as shown in FIG. 3.

If $[2\sin(\pi/N)]^2C$ is considerably small, del2[n] can be used to determine a saturation starting moment. For example, C=100 A and N=64, $[2\sin(\pi/N)]^2C=0.96$ A. del2[n] is a sinusoidal wave in the range of n≤m (range before saturation), and the magnitude thereof does not exceed 0.96 A. Further, at the saturation starting point n=m+1, del2[m+1] is expressed as follows:

$$\begin{aligned}del2[m+1] &= i_{22}[m+1] - 2i_{22}[m] + i_{21}[m-1] \\ &= i_{22}[m+1] - 2i_{21}[m] + i_{21}[m-1]\end{aligned} \quad (6)$$

The approximation of Equation (6) can be made using the relation of the following Equation (7). Equation (7) corresponds to the second order differences of secondary currents in the range before saturation. Since the second order differences are considerably small (0.96 A), as described above, which is negligible. The maximum error of the approximation is less than 0.96 A.

$$i_{21}[m+1] - 2i_{21}[m] + i_{21}[m-1] \approx 0 \quad (7)$$

Figure 2:
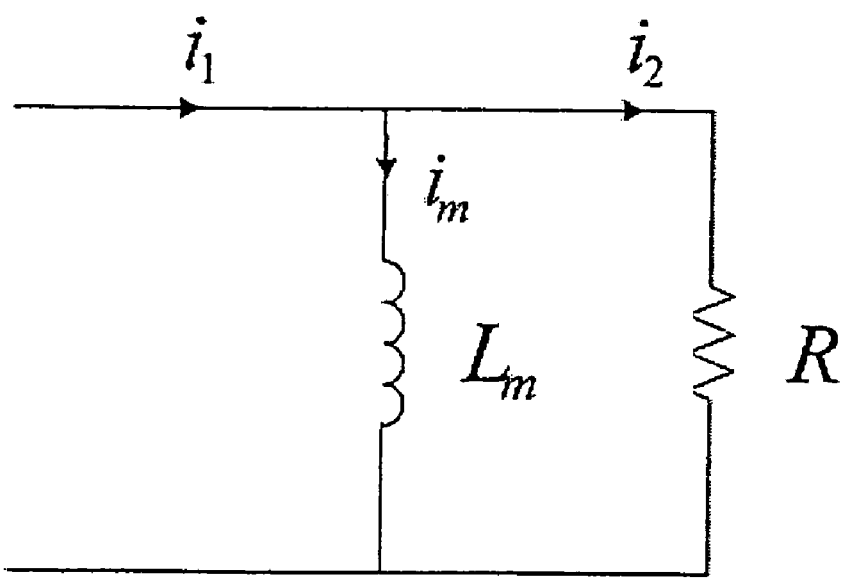
FIG. 2 is a diagram showing a schematic equivalent circuit of the current transformer.

Accordingly, del2[m+1] can be approximated as $i_{22}[m+1] - i_{21}[m+1]$. In this case, since $i_{21}[m+1]$ is a point on a virtually extended line, $i_{21}[m+1]$ can be considered a secondary current value measured at n=m+1 if it is assumed that a transition before saturation continues. Accordingly, del2[m+1] is a magnetizing current at the moment, that is, a value obtained by adding a negative sign to a current flowing through a magnetizing branch of FIG. 2.

Accordingly, if −del2[m+1] is substituted to the magnetization curve, a magnetic flux can be determined at a saturation starting moment. Thereafter, secondary currents applying with a current transformation ratio can be estimated by calculating the magnetic flux of a steel core at every moment using the magnetic flux value at the saturation starting moment obtained above as an initial value, obtaining a magnetizing current at a corresponding moment by substituting the magnetic flux of the steel core to the magnetization curve, and adding a measured secondary current to the magnetizing current.

Figure 4:
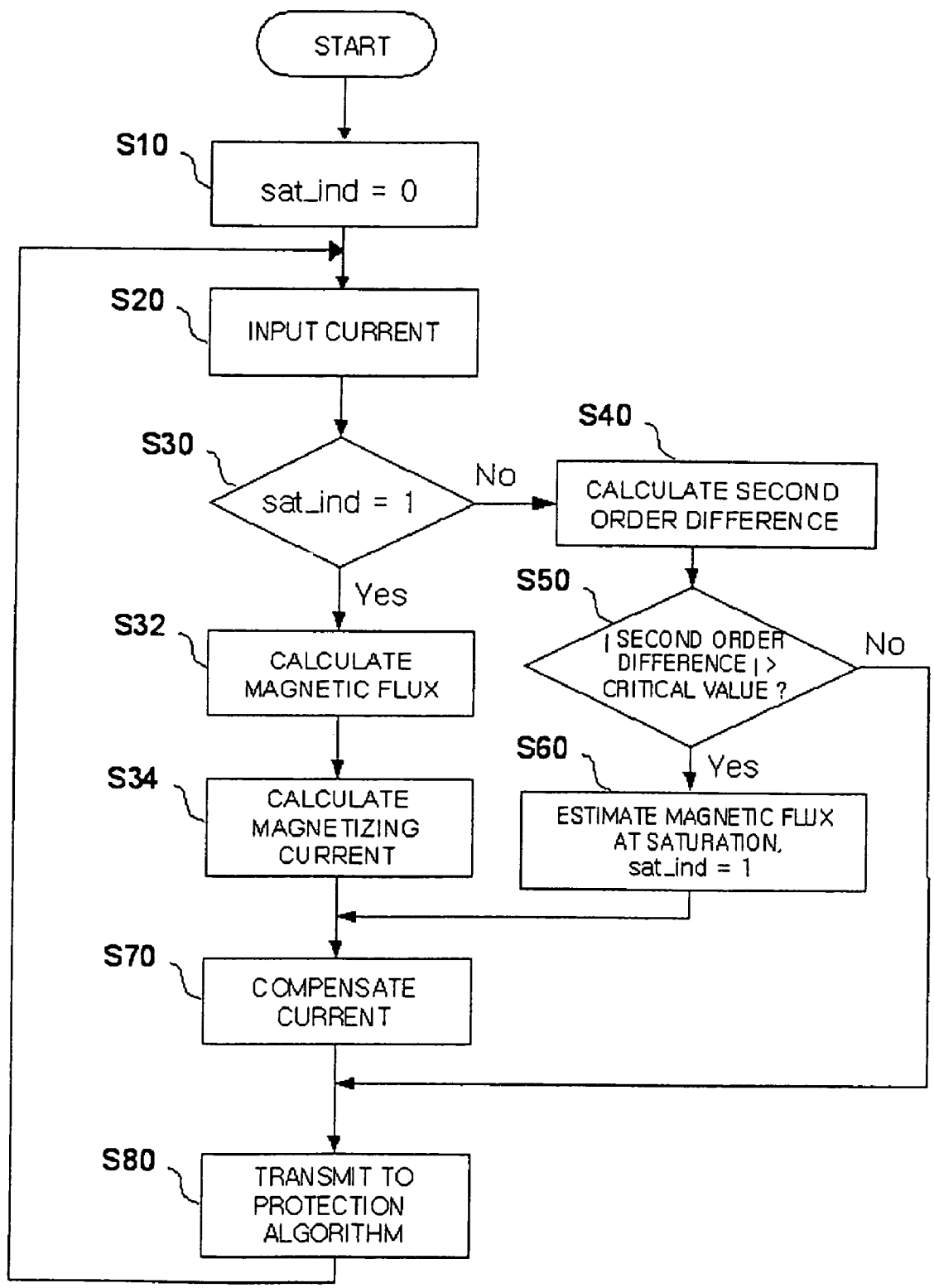
FIG. 4 is a flowchart showing an embodiment to which a compensation method of the present invention is applied.

FIG. 4 is a flowchart showing a method of determining a saturation starting moment using the second order difference for secondary currents measured as described above, obtaining secondary currents consistent with a current transformation ratio and compensating the measured secondary currents, in accordance with an embodiment of the present invention.

$Sat_{13}$ ind, which is an index indicating whether or not saturation is established, is defined at step S10, and an initial value is set. For example, the case where sat_ind is 0 is defined as saturation not being established, while the case where sat_ind is 1 is defined as saturation being established. Thereafter, a secondary current sampled at a corresponding moment (for example, n=k) is received at step S30. If sat_ind=0, that is, before saturation, a second order difference value is calculated at step S40. If the absolute value of the second order difference is more than a predetermined critical value, it is determined that saturation is established at that moment at step S50. If it is determined that saturation is established at that moment, the magnetic flux value at the saturation starting moment is estimated by substituting −del2[m+1] to a magnetization curve using the method described above, and sat_ind, which is the index indication that saturation is established, is set to "1" and displayed at step S60. Thereafter, the measured secondary current value is compensated to obtain a secondary current value consistent with a current transformation ratio at step S70. The compensated value is transmitted to a current transformer protection algorithm at step S80. If saturation is not established, the measured secondary current value is a secondary current value consistent with the current transformation ratio and reflects the transition of currents as it is, so that the measured secondary value is directly transmitted to the current transformer protection algorithm.

Since sat_ind has been set to "1" at the next moment (for example, n=k+1), the step S20 of inputting a current sampled at a corresponding moment is performed. The magnetic flux of the steel core is calculated using the magnetic flux at the saturation starting moment obtained described above at step S32. A magnetizing current is calculated from the magnetization curve at step S34. A secondary current value is obtained by compensating the measured current value using the calculated magnetizing current at step S70. The compensated current value is transmitted to the current transformer protection algorithm at step S80.

Although in the above description, the case of estimating the magnetic flux value at the saturation starting moment using the second order difference has been chiefly discussed, a secondary current consistent with a current transformation ratio may be estimated by obtaining a magnetizing flux value at a saturation starting moment using third or higher order difference values.

The case where the magnetic flux at the saturation starting moment is estimated using the third order difference value is described below.

The third order difference function del3[n] of the measured secondary current $i_2[n]$ is defined as follows:

$$\text{del3}[n]=\text{del2}[n]-\text{del2}[n-1] \quad (8)$$

In the equation, del3[n] is used to determine whether saturation is established, the principle of which is as follows. It can be appreciated from Equations (4) and (5) that del3[n] comprises a sinusoidal term $[2 \sin(\pi/N)]^3 C = 0.000941 C$.

If $[2 \sin(\pi/N)]^3 C$ is considerably small, del3[n] can be used to determine the saturation starting moment. For example, if C=100 A and N=64, $[2 \sin(\pi/N)]^3 C=0.09$ A.

Accordingly, del3[n] is a sine wave in the range of n≦m (range before saturation), and the magnitude of del3[n] does not exceed 0.09 A. Further, at the saturation starting moment n=m+1, $$\text{del3}[m+1]=i_{22}[m+1]-3i_{21}[m]+3i_{21}[m-1]-i_{21}[m-1] \quad (9)$$

Equation (9) can be estimated to the following Equation (10), the maximum error of which is less than 0.09 A.

$$i_{21}[m+1]-3i_{21}[m]+3i_{21}[m-1]-i_{21}[m-1] \approx 0 \quad (10)$$

Accordingly, del3[n] can be estimated to $i_{22}[m+1]-i_{21}[m+1]$. In this case, $i_{21}[m+1]$ is a point on a virtually extended line, which can be considered a secondary current value at the moment of n=m+1 if it is assumed that a current transformer is not saturated. Accordingly, $i_{22}[m+1]-i_{21}[m+1]$ is a magnetizing current at the moment, that is, a value obtained by adding a negative sign to a current flowing through the magnetizing branch of FIG. 2 at the moment.

By substituting del3[n] to a magnetization curve, a magnetizing flux at the saturation starting moment can be known. Accordingly, from the next moment, by calculating the magnetic flux of a steel core at every moment, obtaining a magnetizing current by substituting the calculated magnetic flux to the magnetization curve and adding a secondary current to the magnetizing current, a secondary current consistent with a current transformation ratio can be estimated.

This case can be represented by the method of FIG. 4. The case can be implemented according to the same flowchart if the absolute values of second order differences are change to the absolute values of second order differences. It is not necessary to use the same determination function to perform the determination of the saturation starting moment (S50) and the estimation of a magnetic flux value at the saturation starting moment (S60). There can be various modifications, such as modifications in which the determination of the saturation starting moment is performed using the second order difference and the estimation of a magnetic flux value is performed using the third order difference and vice versa.

Figure 5:
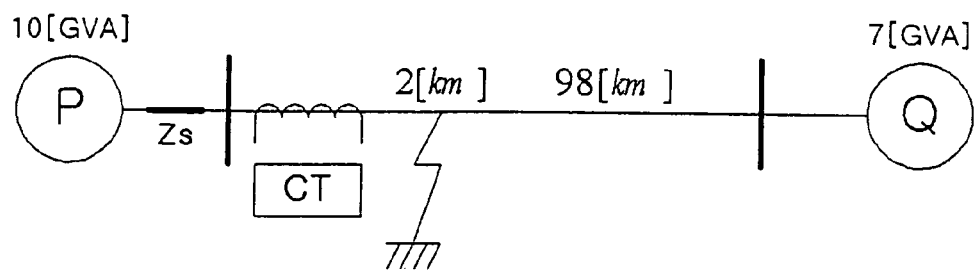
FIG. 5 is a diagram showing an exemplary model system for verifying the method of the present invention.
Figure 6A:
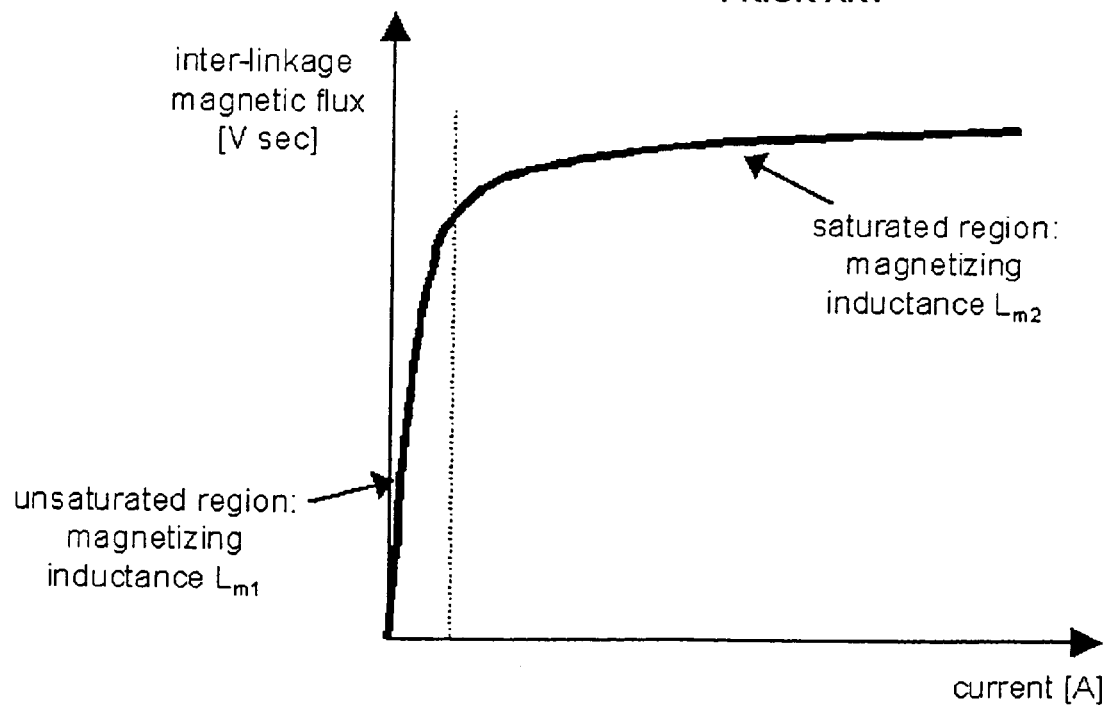
FIGS. 6a and 6b are graphs exemplifying magnetization curves used to compensate the secondary currents of the current transformers.
Figure 6B:
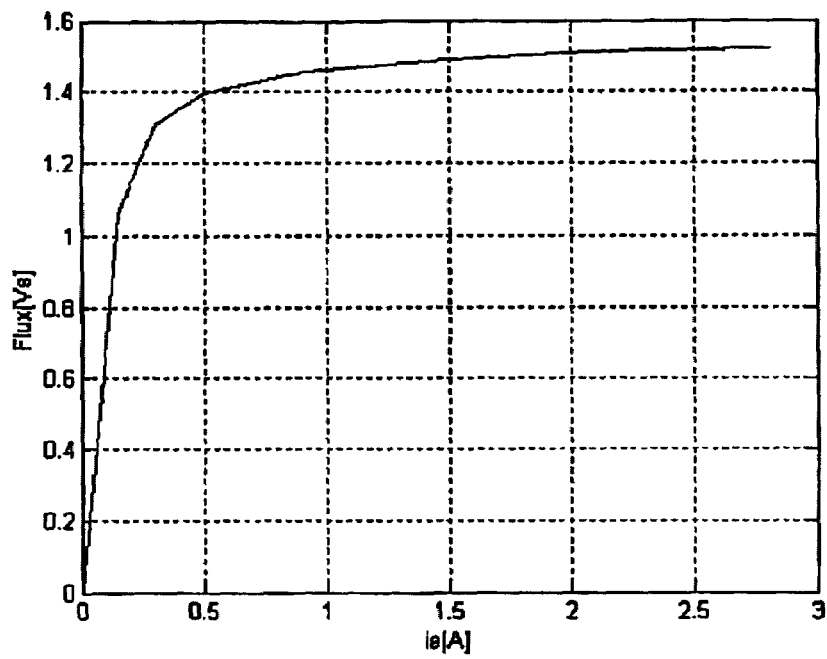

To verify the method of the present invention, a model system of FIG. 5 is selected. The magnetization curve of FIG. 6b is used to compensate the secondary current of the current transformer of FIG. 5. The magnetizing flux of the saturation point of the current transformer is 1.512 Vs.

Figure 7A:
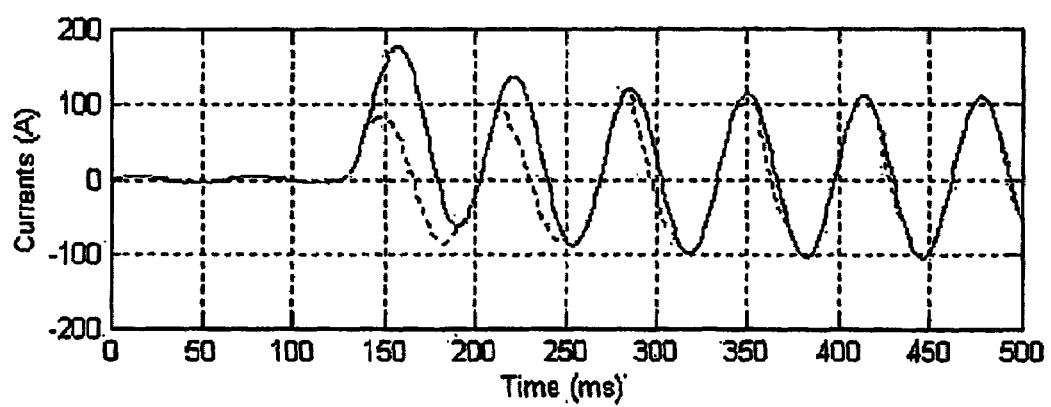
FIG. 7a is a graph showing primary currents divided by a turn ratio (that is, secondary currents consistent with a current transformation ratio) and measured secondary currents.

At the time of an A phase ground fault spaced apart from a P bus by 2 km in the system of FIG. 5, results obtained by applying the method of the present invention to the case where 80% remanent magnetic flux of the current transformer saturation point, that is, 1.2 Vs, exist in the steel core of the current transformer are shown in FIGS. 7a to 7e. In FIG. 7a, a solid line represents currents (secondary currents consistent with a current transformation ratio) obtained by dividing primary currents by a turn ratio, and a dotted line represents measured secondary currents. It can be appreciated from FIG. 7a that secondary currents, measured while a current transformer is saturated by a large remanent magnetic flux, are severely distorted.

Figure 7B:
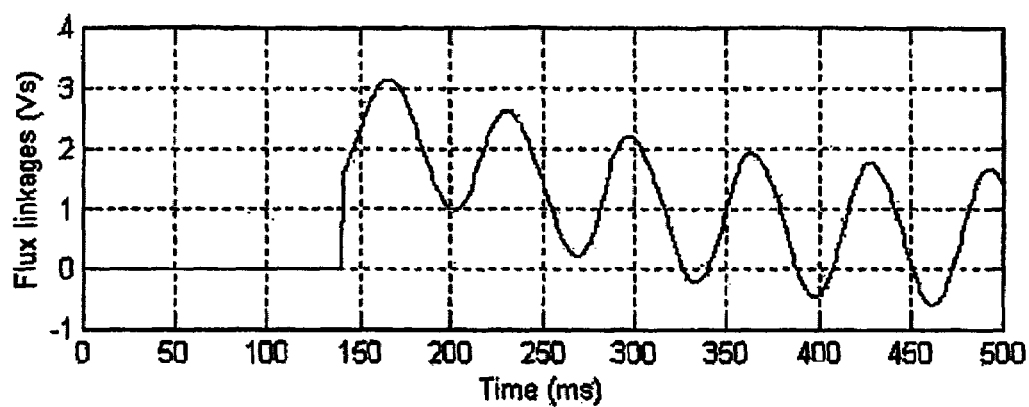
FIG. 7b is a graph showing magnetic fluxes calculated in the case of +80% remanent magnetic flux.

It is determined using the second order differences of the secondary currents whether saturation is established. Magnetic fluxes calculated after saturation are represented in FIG. 7b.

Figure 7C:
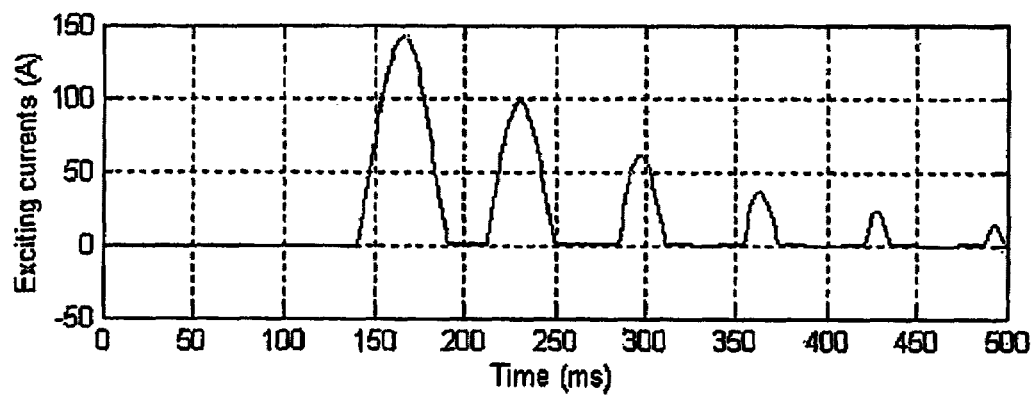
FIG. 7c is a graph showing magnetizing currents estimated in the case of +80% remanent magnetic flux.

Magnetic currents are estimated by substituting these magnetic fluxes to a magnetization curve, and the estimated magnetic fluxes are shown in FIG. 7c.

Figure 7D:
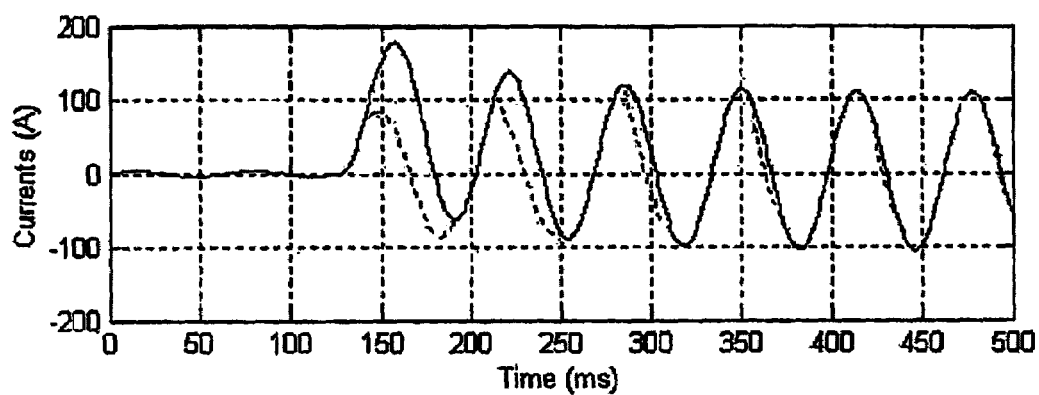
FIG. 7d is a graph showing the secondary currents of the current transformer before and after compensation.

Secondary currents consistent with a current transformation ratio are estimated by adding measured secondary currents to the estimated magnetizing currents, and the estimated secondary currents are shown in FIG. 7d. In FIG. 7d, a dotted line represents measured secondary currents, and a solid line represents secondary currents consistent with a current transformation ratio and estimated by the method of the present invention.

Figure 7E:
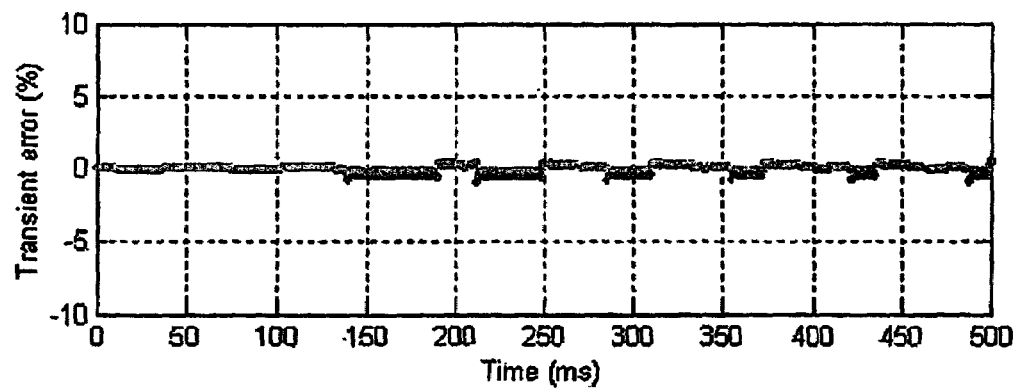
FIG. 7e is a graph showing the transient errors of the estimated secondary currents of the current transformer.

Transient errors calculated to verify the precision of the estimated secondary currents of FIG. 7d are shown in FIG. 7e. Since the error of a current transformation ratio is considerably small, it can be appreciated that the proposed method can estimate precise secondary currents consistent with the current transformation ratio from distorted secondary currents.

Even in the case where a large remanent magnetic flux exist, secondary currents distorted by the saturation of a current transformer can be compensated to obtain secondary currents consistent with a current transformation ratio.

As described above, although in the detailed description of the present invention, the present invention has been described in conjunction with concrete embodiments, these embodiments should be considered illustrative ones. Of course, various modifications are possible without departing from the scope and spirit of the invention. Accordingly, the scope of the present invention must not be determined only by the described embodiments, but must be determined by the equivalent of claims as well as the claims.

INDUSTRIAL APPLICABILITY

In accordance with the present invention, it is possible to estimate a precise secondary current consistent with a current transformation ratio from a measured secondary current even during the saturation of a current transformer, thus preventing the unwanted maloperation of a protective relay system at a fault and enabling the rapid and precise protection of a power system.

The invention claimed is:

1. A method of compensating for secondary currents of current transformers due to saturation, comprising the steps of:

(a) determining a saturation starting moment of a current transformer by calculating difference values having at least second order for sampled secondary currents and comparing absolute values of the difference values with a predetermined critical value;

(b) obtaining a secondary current value consistent with a current transformation ratio where the effects of the saturation are removed, at a time after the saturation starting moment by:

(i) obtaining a magnetizing current at the saturation starting moment using the difference values if the saturation starting moment is determined, and obtaining a magnetic flux value in a steel core of the current transformer from a magnetization curve using the magnetizing current;

(ii) calculating a magnetic flux value at a time after the saturation starting moment using a secondary current value measured at that time and the magnetic flux value obtained at the saturation starting moment;

(iii) obtaining a magnetizing current at that time from the magnetization curve using the magnetic flux value calculated at that time; and (iv) adding the obtained magnetizing current to the measured secondary current value at that time.

2. The method as set forth in claim 1, wherein the step of obtaining the magnetic flux value in the steel core at the saturation starting moment further comprises the step of approximating the magnetizing current at the saturation starting moment as a value obtained by assigning a negative sign to each difference value.

3. The method as set forth in claim 1, wherein the difference values are second order difference values.

4. The method as set forth in claim 1, wherein the difference values are third order difference values.

5. The method as set forth in claim 2, wherein the difference values are second order difference values.

6. The method as set forth in claim 2, wherein the difference values are third order difference values.

7. A storage medium storing a computer program for compensating for distortion of secondary currents of current transformers due to saturation, the program executing the steps of:

(a) determining a saturation starting moment of a current transformer by calculating difference values having at least second order for sampled secondary currents and comparing absolute values of the difference values with a predetermined critical value;

(b) obtaining a secondary current value consistent with a current transformation ratio where the effects of the saturation are removed, at a time after the saturation starting moment by:

(i) obtaining a magnetizing current at the saturation starting moment using the difference values if the saturation starting moment is determined, and obtaining a magnetic flux value in a steel core of the current transformer from a magnetization curve using the magnetizing current;

(ii) calculating a magnetic flux value at a time after the saturation starting moment using a secondary current value measured at that time and the magnetic flux value obtained at the saturation starting moment;

(iii) obtaining a magnetizing current at that time from the magnetization curve using the magnetic flux value calculated at that time; and (iv) adding the obtained magnetizing current to the measured secondary current value at that time.

8. The storage medium as set forth in claim 7, wherein the step of obtaining the magnetic flux value in the steel core at the saturation starting moment further comprises the step of approximating the magnetizing current at the saturation starting moment as a value obtained by assigning a negative sign to each difference value.

9. The storage medium as set forth in claim 7, wherein the difference values are second order difference values.

10. The storage medium as set forth in claim 7, wherein the difference values are third order difference values.

11. The storage medium as set forth in claim 8, wherein the difference values are second order difference values.

12. The storage medium as set forth in claim 8, wherein the difference values are third order difference values.

13. A protective relay system having a function of compensating for distortion of secondary currents of current transformers due to saturation, comprising:

(a) means for determining a saturation starting moment of a current transformer by calculating difference values having at least second order for sampled secondary currents and comparing absolute values of the difference values with a predetermined critical value;

(b) means for obtaining a secondary current value consistent with a current transformation ratio where the effects of the saturation are removed, at a time after the saturation starting moment by:

(i) obtaining a magnetizing current at the saturation starting moment using the difference values if the saturation starting moment is determined, and obtaining a magnetic flux value in a steel core of the current transformer from a magnetization curve using the magnetizing current;

(ii) calculating a magnetic flux value at a time after the saturation starting moment using a secondary current value measured at that time and the magnetic flux value obtained at the saturation starting;

(iii) obtaining a magnetizing current at that time from the magnetization curve using the magnetic flux value calculated at that time; and (iv) adding the obtained magnetizing current to the measured secondary current value at that time.

14. The protective relay system as set forth in claim 13, wherein the step of obtaining the magnetic flux value in the steel core at the saturation starting moment further comprises the step of approximating the magnetizing current at the saturation starting moment as a value obtained by assigning a negative sign to each difference value.

15. The protective relay system as set forth in claim 13, wherein the difference values are second order difference values.

16. The protective relay system as set forth in claim 13, wherein the difference values are third order difference values.

17. The protective relay system as set forth in claim 14, wherein the difference values are second order difference values.

18. The protective relay system as set forth in claim 14, wherein the difference values are third order difference values.

* * * * *

UNITED STATES PATENT AND TRADEMARK OFFICE
CERTIFICATE OF CORRECTION

| | |
|---|---|
| PATENT NO. | : 7,103,485 B2 |
| APPLICATION NO. | : 10/494870 |
| DATED | : September 5, 2006 |
| INVENTOR(S) | : Kang et al. |

It is certified that error appears in the above-identified patent and that said Letters Patent is hereby corrected as shown below:

Column 10, Line 37, Claim 13, "at the saturation starting;" should read
-- at the saturation starting moment; --

Signed and Sealed this

Ninth Day of January, 2007

JON W. DUDAS
*Director of the United States Patent and Trademark Office*